United States Patent [19]

Nakajima et al.

[11] Patent Number: 5,128,699

[45] Date of Patent: Jul. 7, 1992

[54] IMAGE RECORDING APPARATUS CAPABLE OF CHANGING DOT DENSITY AND DOT SIZE

[75] Inventors: Tomohiro Nakajima, Machida; Kazuyuki Shimada, Chofu, both of Japan

[73] Assignee: Ricoh Company, Ltd., Tokyo, Japan

[21] Appl. No.: 616,173

[22] Filed: Nov. 20, 1990

[30] Foreign Application Priority Data

Nov. 22, 1989 [JP] Japan .................. 1-304325

[51] Int. Cl.$^5$ .......................................... G01D 15/14
[52] U.S. Cl. ...................... 346/160; 358/298; 358/300; 358/459
[58] Field of Search ............ 358/298, 459, 300; 346/108, 160

[56] References Cited

U.S. PATENT DOCUMENTS

| | | | |
|---|---|---|---|
| 4,198,154 | 4/1980 | Masegi et al. | 358/298 |
| 4,647,184 | 3/1987 | Russell et al. | 358/298 |
| 4,862,289 | 8/1989 | Shimuda | 358/298 |
| 4,914,455 | 4/1990 | Hayes | 346/108 |
| 4,942,406 | 7/1990 | Tsuda | 346/108 |
| 5,006,705 | 4/1991 | Saito et al. | 346/108 |

Primary Examiner—Benjamin R. Fuller
Assistant Examiner—Randy W. Gibson
Attorney, Agent, or Firm—Cooper & Dunham

[57] ABSTRACT

An image recording apparatus includes an electrophotography process mechanism for forming an image made of a plurality of dots in accordance with an electrophotography process, a dot density controller for controlling a dot density on the image formed by the electrophotography process means, the dot density being a number of dots formed on a predetermined area, and a dot size controller for controlling a size of each dot on the image, wherein the size of each dot on the image is controlled by the dot size controller in accordance with the dot density controlled by the dot density controller.

14 Claims, 8 Drawing Sheets

IMAGE RECORDING APPARATUS CAPABLE OF CHANGING DOT DENSITY AND DOT SIZE

BACKGROUND OF THE INVENTION

The present invention generally relates to an image recording apparatus, and more particularly, to an image recording apparatus, such as a laser printer, a facsimile and a copy machine, in which an image is formed in accordance with an electrophotography process.

In an image recording apparatus in which an image is formed in accordance with an electrophotography process, a laser beam modulated in accordance with image data for every pixel scans a photo sensitive member so that a latent image corresponding to the image data is formed on the photo sensitive member. Then, the latent image is developed by a developer device so that a toner image corresponding to the latent image is formed on the photo sensitive member. The toner image formed on the photo sensitive member is transferred to a recording medium by a transfer unit. As a result, a visible image is formed on the recording medium. The visible image is a dotted image based on the modulation of the laser beam. That is, the visible image is made of a plurality of dots.

A dot density is the number of dots formed in a predetermined area. The dot density of the image formed by the image recording apparatus is determined by the frequency with which the laser beam writes the dots and the number of times the laser beam scans in a predetermined time. In a case where the laser beam is deflected by a rotated polygonal mirror, the number of times the laser beam scans in the predetermined time is determined by the rotation frequency of the polygonal mirror.

In the conventional image recording apparatus, the frequency with which the laser beam writes the dots and the rotation frequency of the polygonal mirror are respectively controlled at standard values. That is, in the conventional image recording apparatus, the dot density of the image formed by the laser beam is determined as a fixed value.

Recently, with the increase in the use of image recording apparatus in which the electrophotography process is performed, such as laser beam printers, it has been desired that users be capable of changing the dot density in accordance with the image. However, in the conventional image recording apparatus, the dot density is determined as a fixed value so that it is impossible for the users to change the dot density.

In addition, even if the dot density could can changed, there is the following problem.

FIGS. 1A and 1B show line images formed by three dots 1. When the diameter of the laser beam spot fits in a pitch (P) between the dots 1 in the sub scanning direction, as shown in FIG. 1A, a fine line image is obtained. The above pitch (P) is defined as the distance between the centers of the dots 1 which are adjacent to each other in the sub scanning direction. When the diameter of the laser beam spot is less than the pitch between the dots 1, as shown in FIG. 1B, the dots 1 are separated from each other so that the quality of the line image deteriorates. FIGS. 1C and 1D show an image in which the whole area is black in color. In this case, the area onto which the laser beam is projected becomes black in color. When the diameter of the laser beam spot fits in the pitch between the dots 1 in the sub scanning direction, as shown in FIG. 1C, a fine image is formed. But, when the diameter of the laser beam spot is less than the pitch between the dots 1, the dots 1 formed on a scanning line are separated from the dots formed on the adjacent scanning line, as shown in FIG. 1D. That is, white lines extending in the main scanning direction are provided in the image which is black in color so that the quality of the image deteriorates.

A relationship between the pitch between the dots, corresponding to the dot density, and the optimum diameter (D) of the laser beam spot to each pitch (P) of the dots is indicated in the following Table-1.

TABLE 1

| DOT DENSITY | PITCH (P) | OPTIMUM DIAMETER (D) |
| --- | --- | --- |
| 300 dpi. | 85 μm | 120 μm |
| 240 dpi. | 106 μm | 150 μm |
| 200 dpi. | 127 μm | 180 μm |

SUMMARY OF THE INVENTION

Accordingly, a general object of the present invention is to provide an image recording apparatus in which the disadvantage of the aforementioned prior art is eliminated.

A more specific object of the present invention is to provide an image recording apparatus in which it is possible for the users to change the dot density of the image formed by the image recording apparatus and to record a fine image even if the dot density is changed.

The above objects of the present invention are achieved by an image recording apparatus comprising electrophotography process means for forming an image made of a plurality of dots in accordance with an electrophotography process, dot density control means, coupled to the electrophotography process means, for controlling a dot density on the image formed by the electrophotography process means, the dot density being a number of dots formed on a predetermined area, and dot size control means, coupled to the electrophotography process means, for controlling a size of each dot on the image, wherein the size of each dot on the image is controlled by the dot size control means in accordance with the dot density controlled by the dot density control means.

Additional objects, features and advantages of the present invention will become apparent from the following detailed description when read in conjunction with the accompanying drawings.

DESCRIPTION OF THE PREFERRED EMBODIMENTS

A description will now be given of an embodiment of the present invention with reference to the accompanying drawings.

Figure 1C:
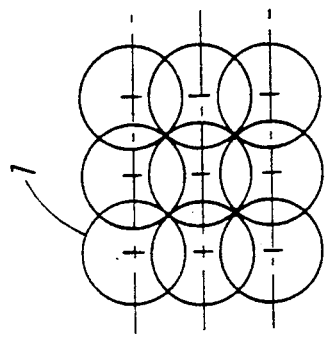
FIGS. 1A through 1D show relationships between the diameter of the laser beam spot and the pitch between the dots which are adjacent to each other in the sub scanning direction.
Figure 1D:
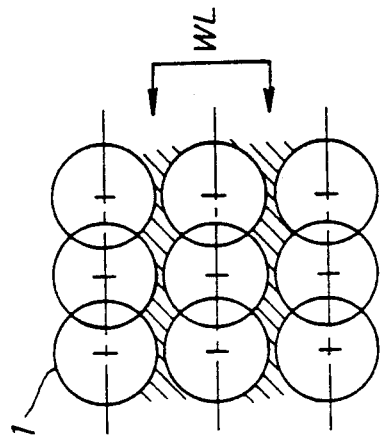
Figure 1A:
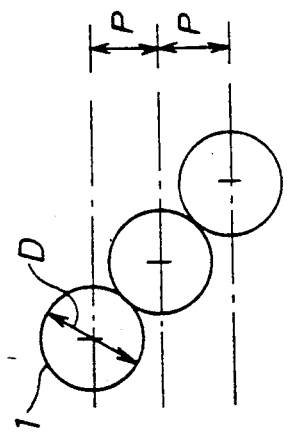
Figure 1B:
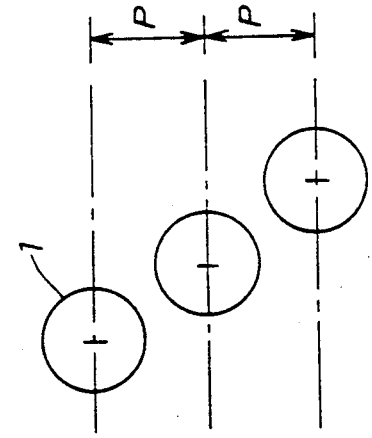
Figure 2:
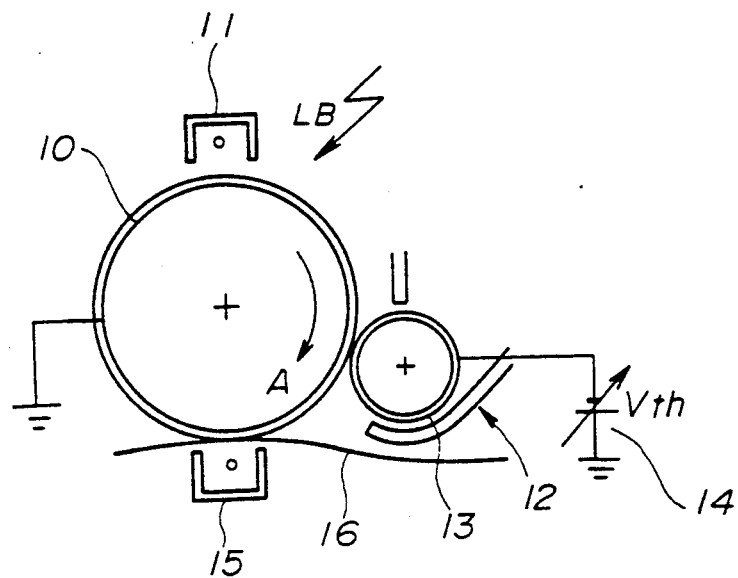
FIG. 2 is a diagram showing a basic structure of the laser beam printer according to an embodiment of the present invention.
Figure 3:
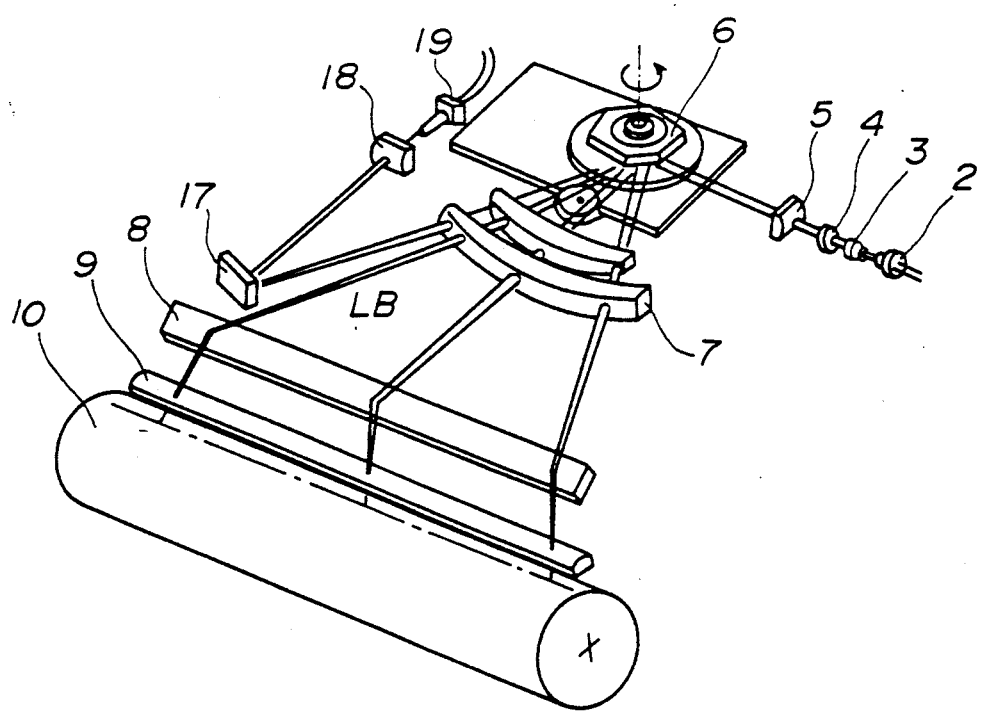
FIG. 3 is a perspective view showing the structure of a scanning system in the laser beam printer.

FIG. 2 and FIG. 3 show an example of the basic structure of the laser beam printer.

Referring to FIG. 3, which shows the scanning system in the laser beam printer, a laser beam emitted from a laser unit 2 formed of a semiconductor device is incident, via a collimator lens 3, an aperture 4 and a lens 5, on a polygonal mirror 6. The laser beam passes through the collimator lens 3 so that the laser beam is changed into parallel rays of light. The polygonal mirror 6 is rotated by a motor so that the laser beam incident on the polygonal mirror is deflected in a predetermined angle range. The laser beam deflected by the polygonal mirror 6 is incident, via an f-$\theta$ lens 7, a mirror 8 and a cylindrical lens 9, on a surface of a photo sensitive drum 10. The laser beam (LB) incident on the photo sensitive drum 10 forms a laser beam spot on the surface of the photo sensitive drum 10. The laser beam spot corresponds to a dot on the image. In this embodiment, the diameter of the laser beam spot is determined as being the optimum diameter corresponding to the largest dot density possible. The scanning system is provided with a synchronous sensor 19 such as a photo transistor. The laser beam (LB) is incident on the synchronous sensor 19 immediately before the laser beam (LB) starts scanning the photo sensitive drum 10. Therefore, the synchronous sensor 19 detects the starting of the scanning.

Referring to FIG. 2, which shows parts of the laser beam printer in which the electrophotography process is performed, the photo sensitive drum 10 is rotated in a direction denoted by an arrow (A). A charger unit 11, a developer device 12 and a transfer charger unit 15 are arranged around the photo sensitive drum 10. The surface of the photo sensitive drum 10 is uniformly charged at a predetermined electric potential $V_D$ by the charger unit 11. When the laser beam from the scanner system, as shown in FIG. 2, scans and exposes the surface of the photo sensitive drum 10, the charge provided on an area of the surface of the photo sensitive drum 10 exposed by the laser beam is removed, so that the electrostatic latent image is formed on the surface of the photo sensitive drum 10. The electric potential of the electrostatic latent image changes to $V_L$. The developer device 12 has a developer roller 13 for suppling toner to the surface of the photo sensitive drum 10. A power source 14 having an output voltage capable of being controlled is connected to the developer roller 13. That is, the developer roller 13 is biased at a predetermined potential which is called the developing bias potential $V_{th}$.

Toner is uniformly adhered on the surface of the developer roller 13, and then the toner is attracted onto the surface of the photo sensitive drum 10 in accordance with the difference between the electric potential $V_L$ of the electrostatic latent image formed on the surface of the photo sensitive drum 10 and the developing potential $V_{th}$ supplied to the developer roller 13. The toner adhered on the surface of the photo sensitive drum 10 is transferred to a recording sheet 16 by the transfer charger unit 15. Thus, a visible image is formed on the recording sheet 16.

A description will now be given of the controlling of the diameter of each of the dots on the image.

Figure 4:
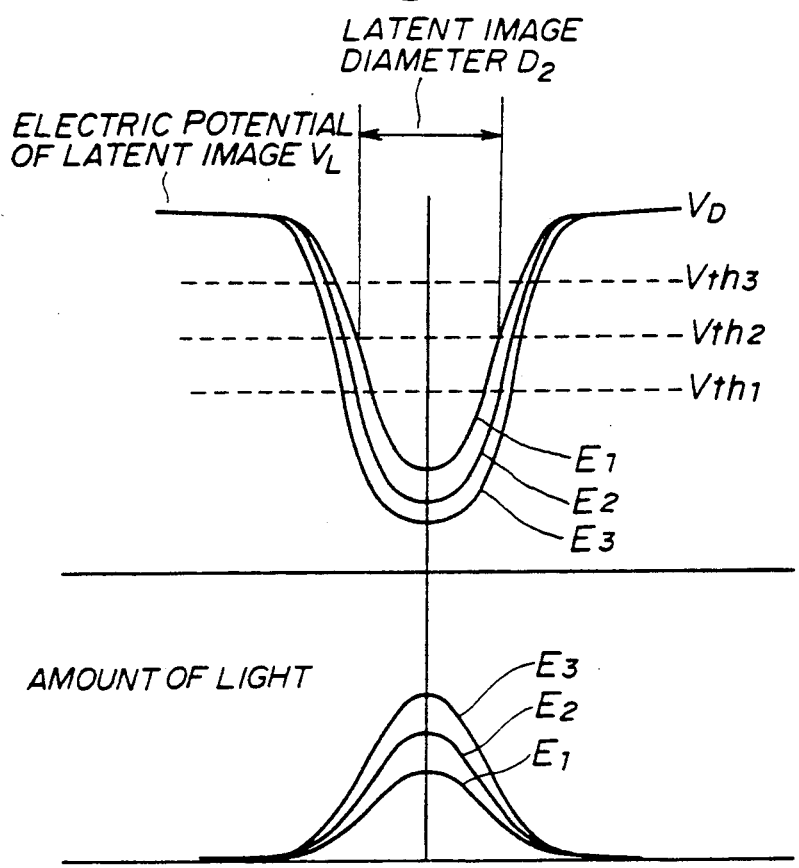
FIG. 4 shows a relationship between the distribution of the amount of light on a photo sensitive member and the distribution of the electric potential in the latent image.

FIG. 4 shows the relationship between the distribution of the amount of light in the spot formed on the surface of the photo sensitive drum 10 by the laser beam (LB) and the distribution of the electric potential $V_L$ of the electrostatic latent image in the spot. Referring to FIG. 4, when the amount of light on the spot increases in the order of $E_1$, $E_2$ and $E_3$, an exposure potential which is the minimum electric potential of th electrostatic latent image decreases successively. The toner is generally adhered on an area where the electric potential $V_L$ of the electrostatic latent image is greater than the developing bias potential $V_{th}$. The width of the area where the electric potential $V_L$ is greater than the developing potential $V_{th}$ is called a latent image diameter D. In FIG. 4, when the amount of light on the spot is $E_1$ and the developer potential is $V_{th2}$, the latent image diameter is $D_2$.

Figure 5:
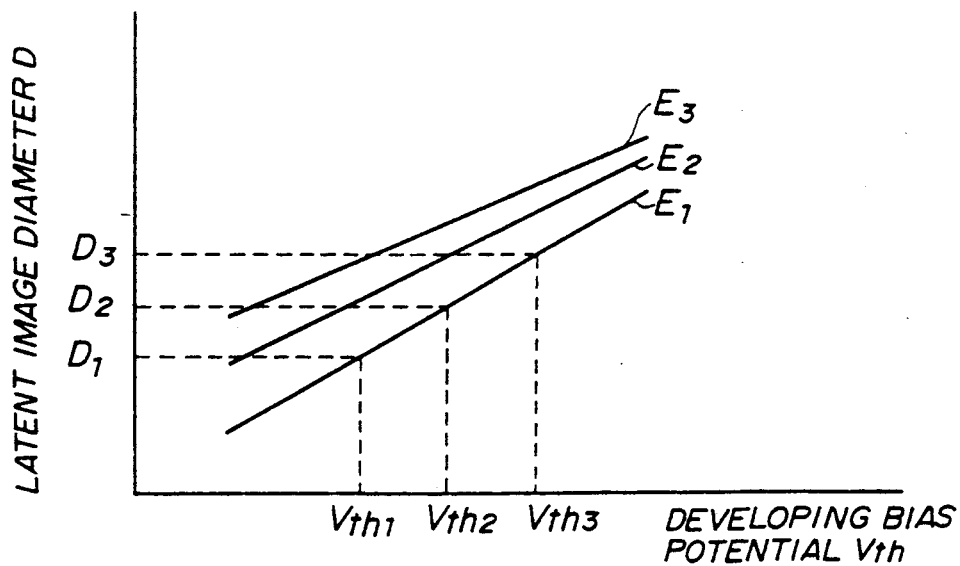
FIG. 5 is a graph showing a relationship between the diameter of the dot latent image and the bias electric potential used for developing the image.

FIG. 5 shows the relationship between the developing bias potential $V_{th}$ and the latent image diameter D.

Referring to FIG. 5, in a case where the amount of light on the spot is $E_1$, when the developing bias potential is increased in the order of $V_{th1}$, $V_{th2}$ and $V_{th3}$ by the controlling of the power source 14, the latent image diameter D can be increased in the order of $D_1$, $D_2$ and $D_3$. In the other cases where the amount of light on the spot is either $E_2$ or $E_3$, the image diameter D can be increased along with the developer bias potential $V_{th}$ in the same manner as the case where the amount of light on the spot is $E_1$.

Figure 6:
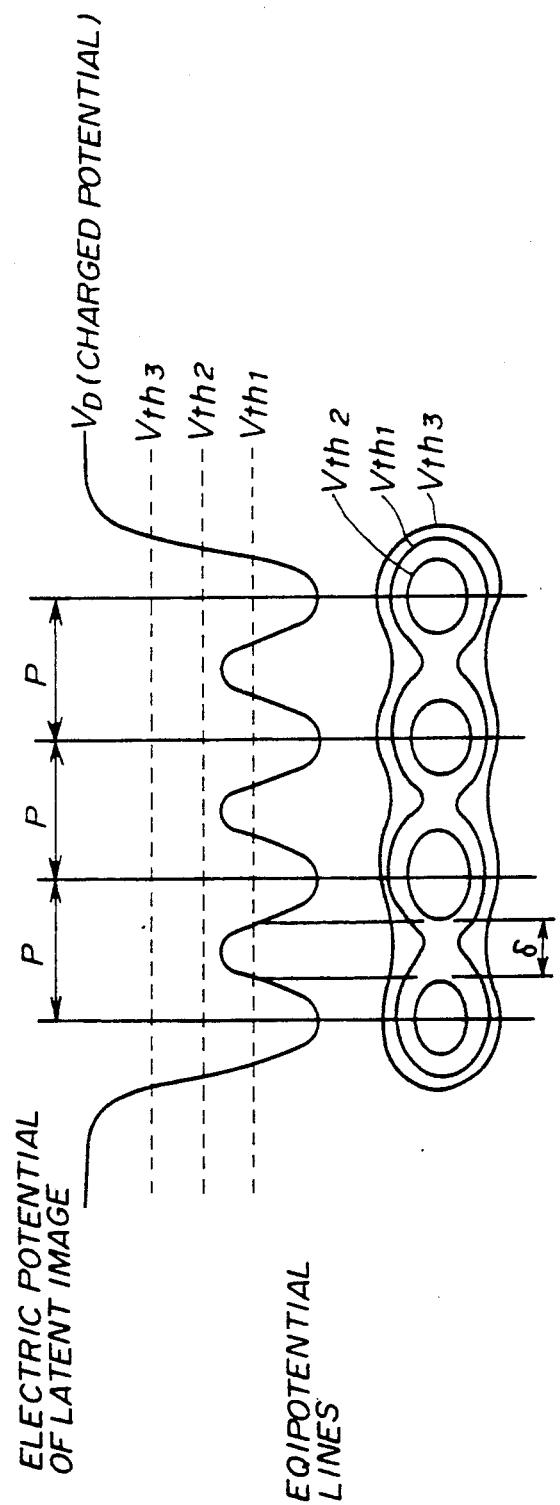
FIG. 6 shows the electric potential in the latent image and the equipotential lines.

FIG. 6 shows the electric potential $V_L$ of the latent image and the equipotential potential lines when a solid line image is formed by 4 dots.

Referring to FIG. 6, the pitch (P) between the dots which are adjacent to each other is determined by the dot density. In the case where the diameter of the laser beam spot is small in comparison with the high dot density and the developer bias potential is $V_{th1}$, the dots on the image are separated from each other and the distance between the adjacent dots is $\delta$ when the dot latent image is formed at the low dot density. In this case, when the developer bias potential $V_{th}$ is increased from $V_{th1}$ to $V_{th3}$, the diameter of each dot on the image is increased so that an image corresponding to a solid line indicated in FIG. 6 is formed.

That is, even if the diameter of the laser beam spot is constant, the diameter of each dot in the toner image can be changed by the changing of the developing bias potential $V_{th}$. Therefore, when the developing bias potential $V_{th}$ is controlled so as to be an optimum value in accordance with the dot density, it is possible to form a fine image on the recording sheet. In addition, when exposure energy such as the intensity of the laser beam is also controlled in accordance with the dot density, it is possible to form a fine image.

A description will now be given of circuits for controlling the dot density with reference to FIGS. 7 and 8.

Figure 7:
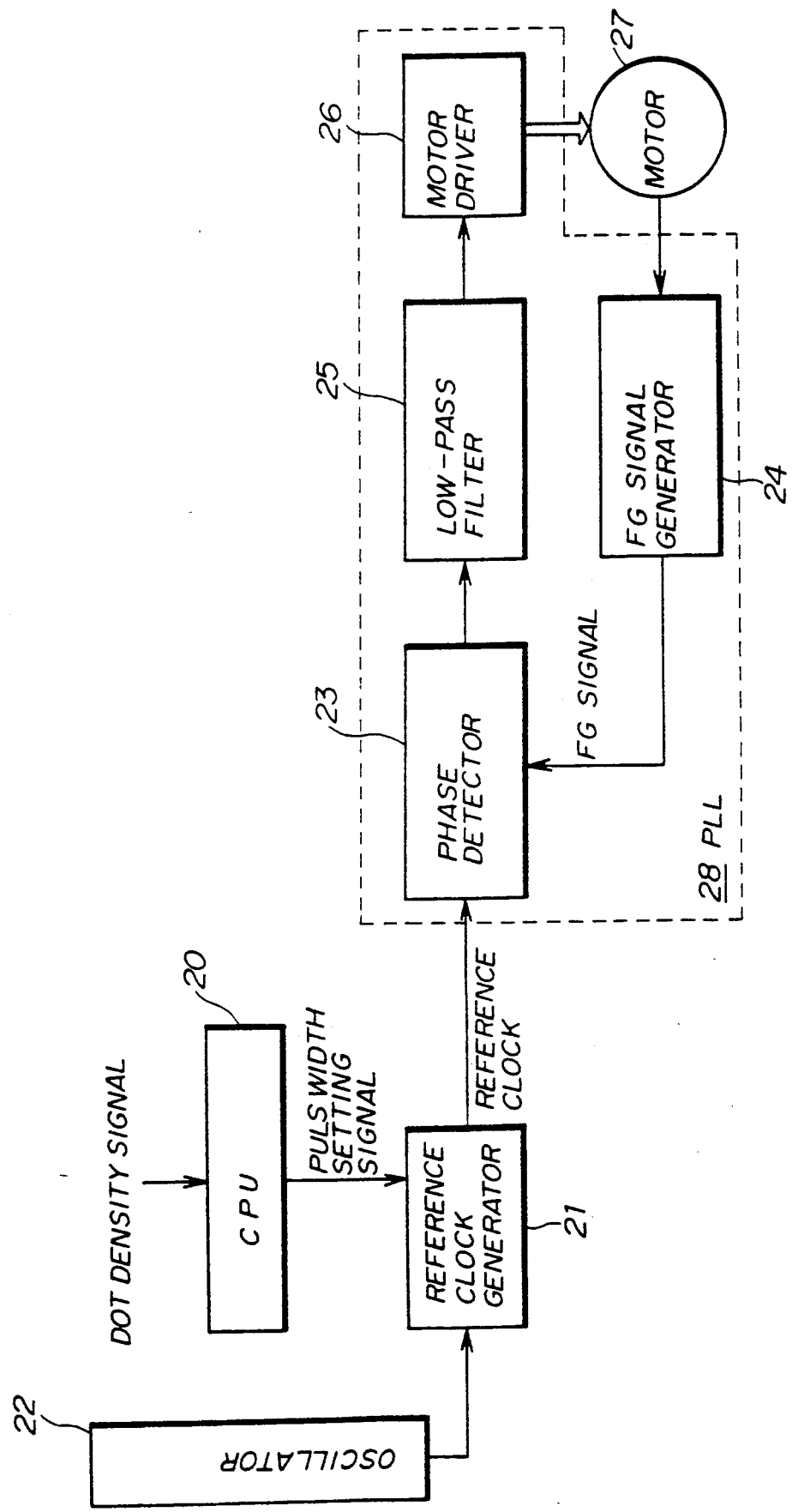
FIG. 7 is a block diagram showing a circuit which controls the rotation frequency of the scanner motor.

FIG. 7 shows the rotation frequency control circuit for controlling a rotation frequency of the motor which rotates the polygonal mirror 6.

Referring to FIG. 7, the rotation frequency control circuit has an oscillator 22, a reference clock generator 21 and a PLL (Phase Locked Loop) circuit 28. The dot density signal corresponding to the dot density specified by the user is supplied to a CPU 20. The CPU 20 outputs a pulse width signal corresponding to the dot density signal. The pulse width signal contains information which represents a pulse width corresponding to the dot density. The pulse width signal is supplied to the reference clock generator 21. The oscillator 22 outputs a predetermined clock signal. The reference clock generator 21 counts the clock signal output from the oscillator 22 and outputs a reference clock signal which has a pulse width corresponding to the pulse width signal supplied from the CPU 20. The reference clock signal output from the reference clock generator 21 is supplied to the PLL circuit 28. The PLL circuit 28 has a phase detector 23, a FG signal generator 24, a low pass filter 25 and a motor driver 26. The phase detector 23 receives the reference clock signal supplied from the reference clock generator 21 and a FG signal output from the FG signal generator 24. The phase detector 23 compares the phase of the FG signal to that of the reference clock signal and outputs a signal corresponding to a phase difference between the FG signal and the reference clock signal. When the signal output from the phase detector 23 passes through the low pass filter 25, the signal is converted into dc voltage. The dc voltage output from the low pass filter 23 is supplied to the motor driver 26, and then the motor driver 26 drives a motor 27 for rotating the polygonal mirror 6 in accordance with the dc voltage. The FG signal generator 24 detects the rotation frequency of the motor 27 and outputs the FG signal which is a pulse signal corresponding to the detected rotation frequency of the motor 27. Then, the FG signal output from the FG signal generator 24 is supplied to the phase detector 23, as has been described above.

According to the rotation frequency control circuit described above, the motor 27 is rotated in accordance with the dot density specified by the user. That is, the rotation frequency of the polygonal mirror 6 is controlled at a value corresponding to the dot density specified by the user.

Figure 8:
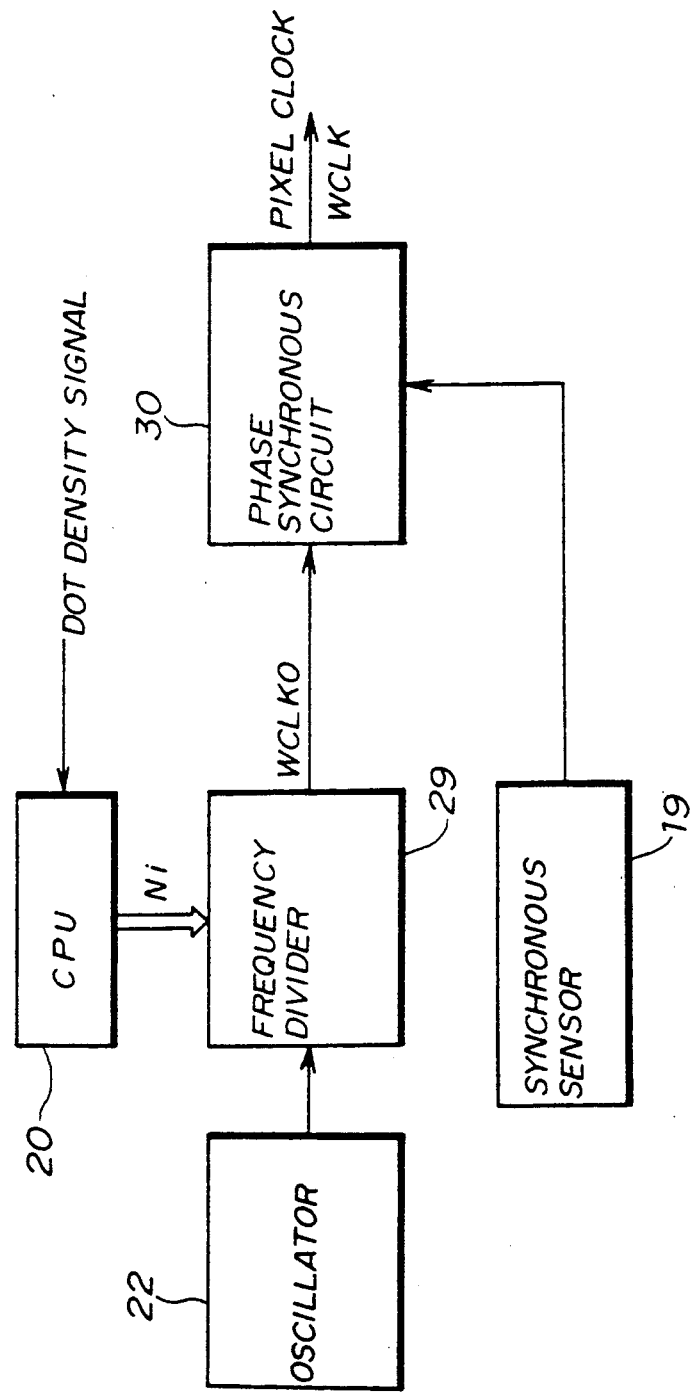
FIG. 8 is a block diagram showing a circuit which controls the frequency with which the laser beam writes the dots.

FIG. 8 shows a writing frequency control circuit which controls the frequency of the synchronous signal used for writing dots.

Referring to FIG. 8, the writing frequency control circuit has a divider 29 and a phase synchronous circuit 30. The CPU 20 outputs a dividing ratio data Ni corresponding to the dot density signal. The frequency divider 29 divides the clock signal output from the oscillator 22 at the dividing ratio Ni and generates an original pixel clock signal (WCLKO). The original pixel clock signal is supplied to the phase synchronous circuit 30. The phase synchronous circuit 30 generates a plurality of signals, each signal having the same cycle time as that of the original pixel signal, and phases of the signals being slightly different from each other. The phase synchronous circuit 30 selects a signal whose phase is identical to that of the synchronous pulse output from the synchronous sensor 19 from among the generated signals. The selected signal is output, as a pixel clock signal (WCLK), from the phase synchronous circuit 30.

The laser unit 2 is modulated in accordance with the image data and in synchronism with the pixel clock signal (WCLK) output from the phase synchronous circuit 30. That is, the laser unit 2 is turned on and off in accordance with the image data and in synchronism with the pixel clock signal (WCLK), and thus the laser beam emitted from the the laser unit 2 writes the dots in synchronism with the pixel clock signal (WCLK). Therefore, the frequency with which the dots are written is controlled in accordance with the dot density.

According to the rotation frequency control circuit shown in FIG. 7 and the writing frequency control circuit shown in FIG. 8, the dot density of the image formed by the image recording apparatus becomes the value specified by the user.

A description will now be given of a unit for controlling the diameter of each dot in the image.

Figure 9:
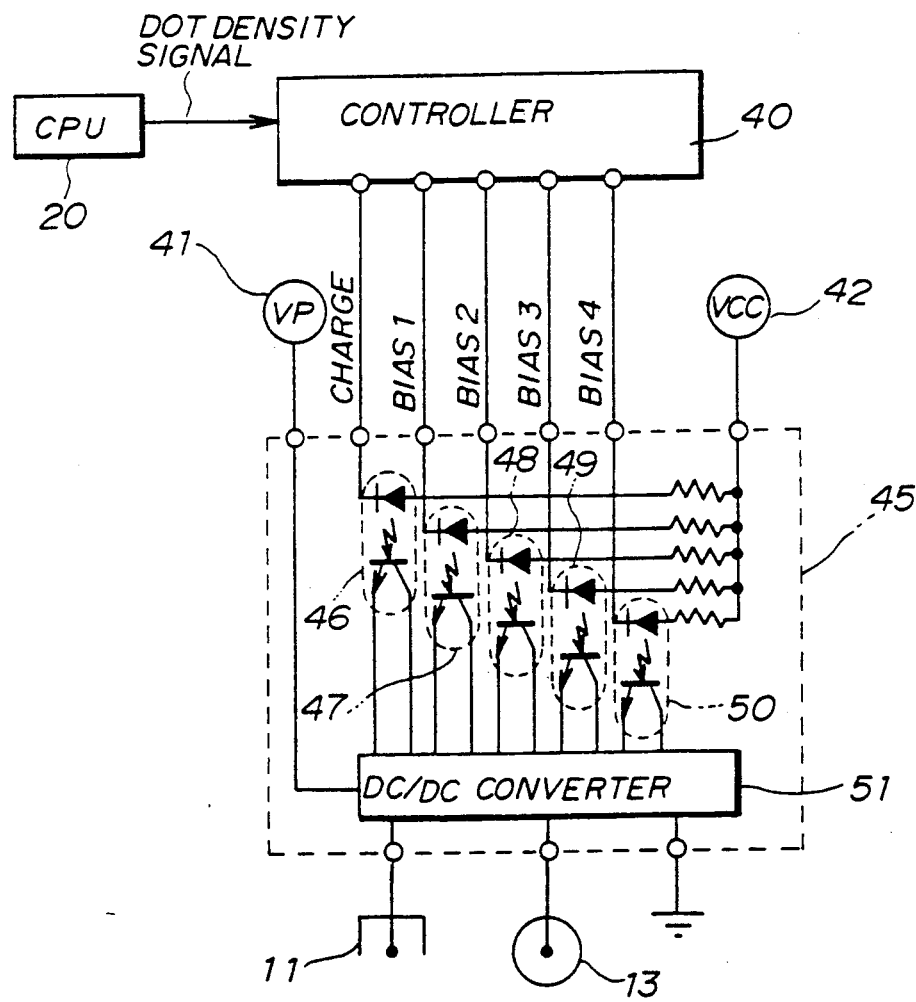
FIGS. 9 through 10B show circuits for controlling the bias electric potential used for developing the image.

FIG. 9 shows a circuit for controlling the charge potential supplied to the charger 11 and the developing bias potential supplied to the developer roller 13.

Referring to FIG. 9, the circuit has a controller 40, a high voltage supply unit 41 (VP), a dc voltage supply unit 42 (Vcc) and a switcher unit 45. The CPU 20 supplies the dot density signal corresponding to the dot density specified by the user to the controller 40. The controller 40 outputs a bias signal corresponding to the dot density. The bias signal has four bits, that is, BIAS 1, BIAS 2, BIAS 3 and BIAS 4. The switcher unit 45 has photocouplers 46 through 50 and a DC/DC converter 51. The dc voltage supply unit 42 supplies the dc voltage Vcc via a resistance to each photocoupler. Four photocouplers 47 through 50 are respectively turned on or off by the bias signal (4 bits) output from the controller 40. The high voltage supply unit 41 supplies a high voltage Vp to the DC/DC converter 51, and the DC/DC converter 51 supplies the developing bias potential $V_{th}$ in accordance with the on and off state of photocouplers 47 through 50. An example of the relationship among the dot density, the bias signal and the developing bias potential $V_{th}$ of each other is show in Table-2

TABLE 2

| DOT DENSITY | DEV. BIAS | BIAS SIG. (4bits) | | | |
|---|---|---|---|---|---|
| 200 dpi | −550 v | 1 | 1 | 1 | 1 |
| 240 dpi | −490 v | 0 | 1 | 1 | 1 |
| 300 dpi | −380 v | 0 | 0 | 1 | 1 |
| 400 dpi | −290 v | 0 | 0 | 0 | 1 |

1: ON, 0: OFF

For example, when the dot density is 200 dpi (dot per inch), the bias signal has the following 4 bit values:

| |
|---|
| BIAS 1 = 1 |
| BIAS 2 = 1 |
| BIAS 3 = 1 |
| BIAS 3 = 1 |

As a result, the developing bias potential is −550 v. In another case, when the dot density is 300 dpi, the bias signal has the following 4 bit values:

| |
|---|
| BIAS 1 = 0 |
| BIAS 2 = 0 |
| BIAS 3 = 1 |
| BIAS 3 = 1 |

As a result, the developing bias potential is −380 v.

The controller 40 also outputs a charge control signal (CHARGE) of one bit. The photocoupler 46 is turned on or off in accordance with the charge control signal (CHARGE). When the photocoupler 46 is turned on, the charge voltage is suppled via the DC/DC converter 51 to the charger unit 11. The charge voltage is, for example, −750 v, which is equal to the high voltage Vp output from the high voltage supply 41.

When the developing bias potential $V_{th}$ is changed as described above, the diameter of each dot in the image formed on the recording sheet is also changed as shown in FIGS. 4 and 5.

Figure 10A:
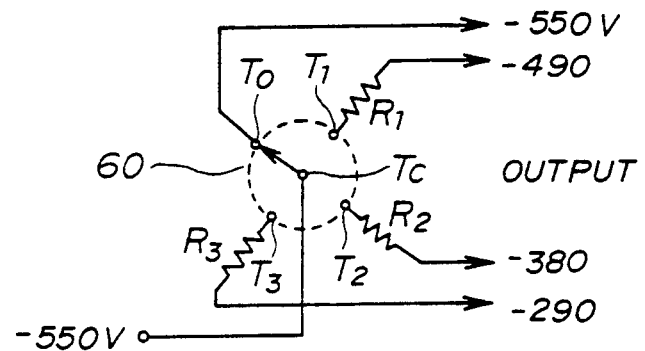
Figure 10B:
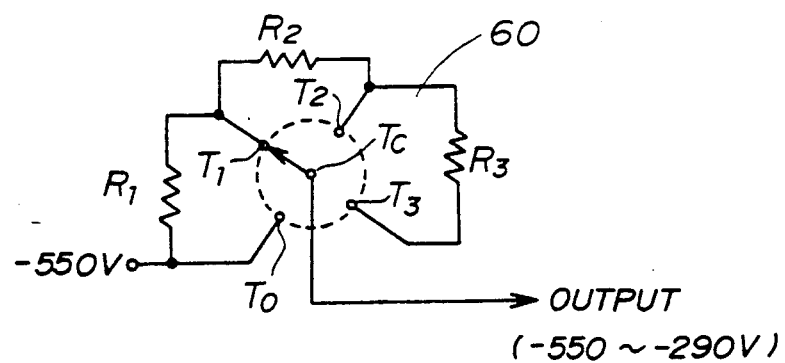

It is possible to change the developing bias potential by use of a switch 60 and resistances R1 through R3, as shown in FIGS. 10A and 10B. In these cases, when the switch 60 selects a predetermined terminal, a corresponding developing bias potential (−550 v, −490 v, −380 v and −290 v) is output from the switch 60. The relationship between the dot density and developing bias potential is identical to that shown in Table-2.

In the above embodiment, the dot density can be changed in accordance with the user's requirement. In addition, as the developing bias potential is controlled in accordance with the dot density, even if the diameter of the laser beam spot is constant, the dots having a diameter which corresponds to the dot density are formed. Therefore, it is possible to record a fine image.

According to the present invention, the dot density and the dot size in the image are respectively controlled so that it is possible to record a fine image.

The present invention is not limited to the aforementioned embodiments, and variations and modifications may be made without departing from the scope of the claimed invention.

What is claimed is:

1. An image recording apparatus comprising:

electrophotography process means for forming an image made of a plurality of dots in accordance with an electrophotography process;

dot density control means, coupled to said electrophotography process means, for controlling a dot density on the image formed by said electrophotography process means, said dot density being defined as a number of dots formed on a predetermined area in the image; and dot size control means, coupled to said electrophotography process means, for controlling a size of each dot on the image, wherein the size of each dot on the image is controlled by said dot size control means in accordance with the dot density controlled by the dot density control means.

2. An image recording apparatus as claimed in claim 1, wherein said electrophotography process means comprises;

a photo sensitive member, latent image forming means for forming an electrostatic latent image corresponding to image data on said photo sensitive member, said latent image forming means having charger means for uniformly charging a surface of said photo sensitive member, and scanning means for emitting a light beam modulated in accordance with the image data, said light beam scanning the uniformly charged surface of said photo sensitive member and successively writing dots on the surface of said photo sensitive member so that the electrostatic latent image is formed on the surface of said photo sensitive member, developer means for supplying toner having a predetermined developer bias potential to said electrostatic latent image formed on the surface of said photo sensitive member so that the electrostatic latent image is developed and a toner image corresponding to said electrostatic latent image is formed on the surface of said photo sensitive member, and transfer means for transferring the toner image formed on the surface of said photo sensitive member to a recording medium.

3. An image recording apparatus as claimed in claim 2, wherein said dot density control means has first control means for controlling a frequency with which the light beam writes the dots on the surface of said photo sensitive member, and second control means for controlling a number times the light beam scans in a predetermined time.

4. An image recording apparatus as claimed in claim 3, wherein said first control means has signal control means for controlling a frequency of a synchronous signal with which the light beam writes the dots in synchronism.

5. An image recording apparatus as claimed in claim 4, wherein said signal control means has a signal generator for generating a clock signal having a frequency corresponding to the dot density specified by a user, and a phase synchronous circuit for adjusting a phase of the clock signal generated by said signal generator to a predetermined phase, the clock signal being used for the synchronous signal for the light beam.

6. An image recording apparatus as claimed in claim 3, wherein said scanning means has a rotating polygonal mirror which deflects the light beam in a predetermined angle range, and wherein said second control means has rotation control means for controlling a rotation frequency of said polygonal mirror.

7. An image recording apparatus as claimed in claim 6, wherein said rotation control means has a reference signal generator for generating a reference clock signal whose frequency corresponds to the dot density specified by the user, and a PLL circuit for driving a motor rotating said polygonal mirror on the basis of said reference clock signal generated by said reference signal generator.

8. An image recording apparatus as claimed in claim 2, wherein said dot size control means has bias control means for controlling the developing bias potential in accordance with the dot density.

9. An image recording apparatus as claimed in claim 8, wherein said bias control means has a controller for outputting a bias signal corresponding to the dot density specified by the user, and a switcher unit for selectively outputting the developing bias potential.

10. An image recording apparatus as claimed in claim 8, wherein said bias control means has a switch for manually selecting a developing bias potential value from a plurality of developing bias potential values.

11. An image recording apparatus comprising:

a photosensitive member;

charger means for uniformly charging a surface of said photosensitive member;

a semiconductor laser unit for emitting a laser beam so that the laser beam is projected onto the surface of the photo sensitive member which has been uniformly charged by said charger member, said semiconductor laser unit being modulated in accordance with image data;

scanning means for making the laser beam emitted from said semiconductor laser unit scan the surface of said photo sensitive member so that an electrostatic latent image made of a plurality of dots is formed on the surface of said photo sensitive member;

developer means for supplying toner having a predetermined developing bias potential to said electrostatic latent image formed on the surface of said photo sensitive member so that the electrostatic latent image is developed and a toner image corresponding to said electrostatic latent image is formed on the surface of said photo sensitive member;

dot density control means for controlling a dot density on the electrostatic latent image formed on the surface of said photo sensitive member, said dot density being defined as a number of dots formed on a predetermined area in the electrostatic latent image; and dot size control means, coupled to said electrophotography process means, for controlling a size of each dot on the toner image, wherein the size of each dot on the toner image is controlled by said dot size control means in accordance with the dot density controlled by the dot density control means.

12. An image recording apparatus as claimed in claim 11, wherein said dot size control means has bias control means for controlling the developing bias potential in accordance with the dot density.

13. An image recording apparatus as claimed in claim 12, wherein said bias control means has a controller for outputting a bias signal corresponding to the dot density specified by the user, and a switcher unit for selectively outputting the developing bias potential.

14. An image recording apparatus as claimed in claim 12, wherein said bias control means has a switch for manually selecting a developing bias potential value from a plurality of developing bias potential values.

* * * * *